T. G. PLANT.
STOPPING MECHANISM.
APPLICATION FILED JUNE 11, 1908. RENEWED NOV. 22, 1909.
958,295.
Patented May 17, 1910.
2 SHEETS—SHEET 2.
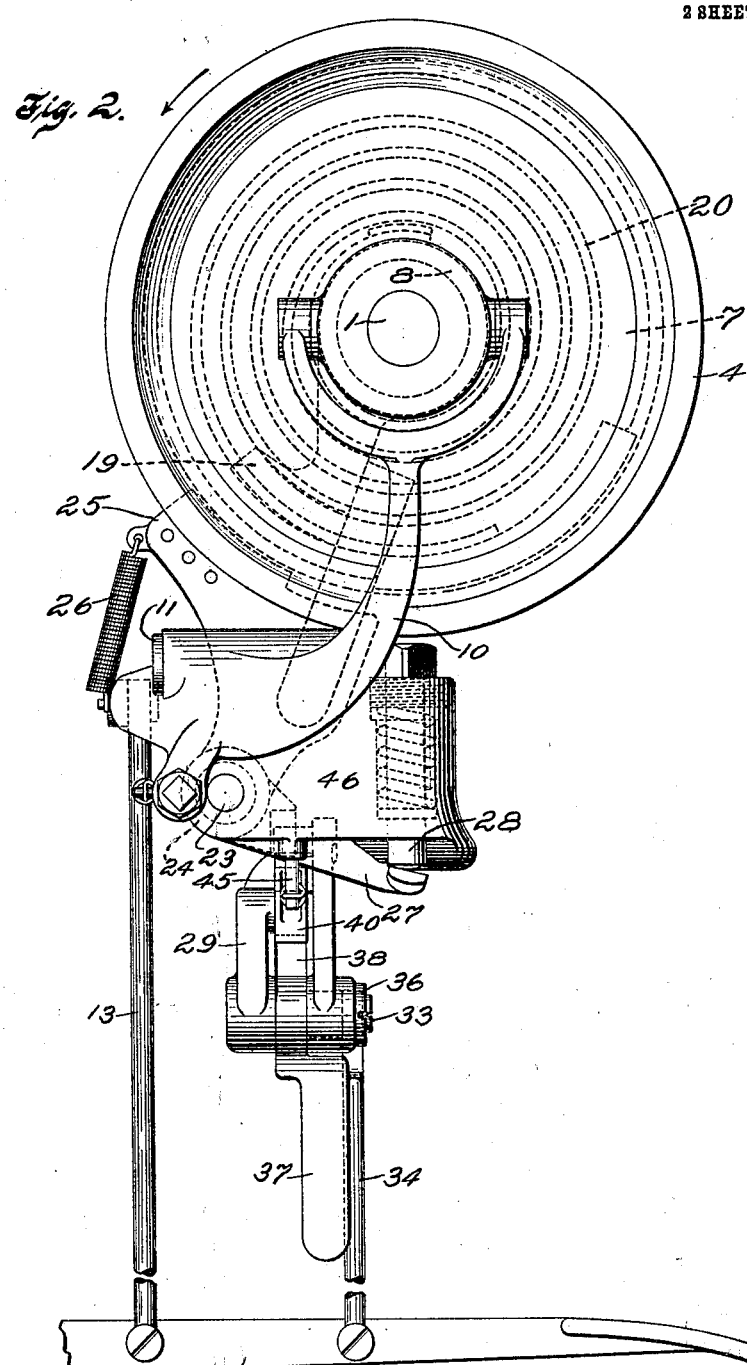

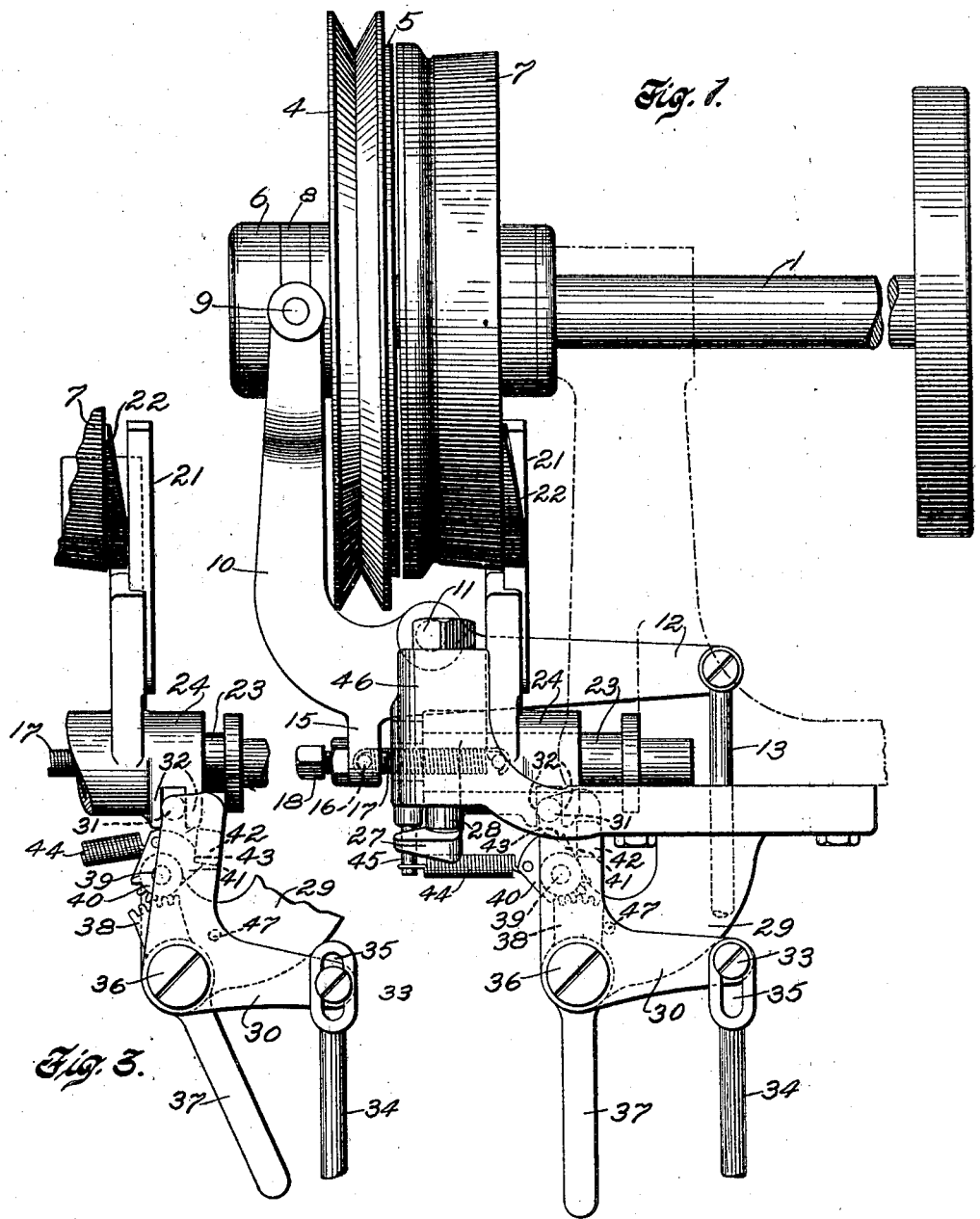

UNITED STATES PATENT OFFICE.

THOMAS G. PLANT, OF BOSTON, MASSACHUSETTS.

STOPPING MECHANISM.

958,295.

Specification of Letters Patent. Patented May 17, 1910.

Application filed June 11, 1908, Serial No. 437,817. Renewed November 22, 1909. Serial No. 529,303.

*To all whom it may concern:*

Be it known that I, THOMAS G. PLANT, a citizen of the United States, residing at Boston, in the county of Suffolk and State of Massachusetts, have invented an Improvement in Stopping Mechanisms, of which the following description, in connection with the accompanying drawings, is a specification, like numerals on the drawings representing like parts.

The invention to be hereinafter described relates to attachments for stopping and starting mechanisms, and more particularly of that type set forth in application Ser. No. 404,795, filed December 2, 1907. As fully set forth in the application referred to, the stopping and starting of the machine is under treadle control, movement of the treadle or its connecting rod in one direction acting to throw into engagement the coöperating members of a clutch and to move a stopping device out of the path of a stop on one of the clutch members, so that the machine might be operated by power; and movement of the parts in the opposite direction acting to disengage the clutch members and permit the stopping devices to occupy a position to engage the said stop, so that while said stopping device is thus positioned, the driving shaft and its connected mechanism could not be operated either by power or by hand. It is often desirable to turn the machine by hand, however, and the object of the present invention is to provide means whereby the associated relation of the clutch members and stopping device may be temporarily disturbed and locked, so that, while the clutch members are disengaged, the machine may be safely operated by hand, all as will hereinafter more fully appear, and the distinguishing characteristics whereof will be definitely pointed out in the claims.

In the drawings: Figure 1 is a side elevation, showing sufficient of a sewing machine and its driving connections to make clear the relation of the present invention therewith; Fig. 2 is an end elevation of the parts shown by Fig. 1; and Fig. 3 is a detached detail of the lower portion of Fig. 1, showing the parts in a different position.

The main supporting frame of the machine may be of any usual or preferred type to provide supports for the driving shaft 1, having loosely mounted thereon the belt pulley 4 constituting the loose member of a clutch. Secured to the driving shaft 1, so as to rotate therewith is the fast clutch member 7, the members 4 and 7 having interposed between them suitable friction material 5, said members 4 and 7 thus constituting one appropriate form of clutch for connecting and disconnecting the shaft 1 and driving means by movement of the loose clutch member 4 toward and from the fast clutch member 7, as will be readily understood.

The hub 6 of the loose clutch member 4 has a ring 8 seated in a suitable recess of the hub, said ring having projecting pins 9 engaged by the upright arm of a clutch operating lever 10, pivotally mounted on the main frame at 11 and having its arm 12 connected by a rod 13 to a suitable treadle 14, Fig. 2. Projecting from the lower part of the lever 10 is a lug 15 having a pin 16 to which is connected one end of a spring 17, the normal tension of which tends to turn the lever 10 contra-clockwise or in a direction to disengage the clutch members 4 and 7, a stop pin 18 serving to limit the movement of the lever 10 by contacting with the framing of the machine as indicated clearly in Fig. 1.

Having reference to Fig. 2, the stop arm 19, shown by dotted lines and mounted loosely with relation to the driving shaft 1, the spring 20 having one end secured to the said stop arm and the other end secured to the fixed clutch member 7, and the stop finger 21, Figs. 1 and 3, adapted, when moved to the left, to be engaged first by the end of the stop arm 19 and then by the abrupt end of the cam 22 as the fast clutch member is reversed by the tension of the spring 20, may be and preferably are substantially the same as the like parts in the application hereinbefore mentioned.

Mounted to slide upon the stud or bearing 23 secured in the machine frame is the sleeve 24 carrying the stop finger 21, said sleeve having also secured thereto or formed integral with it a brake shoe 25, normally held from contact with the peripheral surface of the fast clutch member 7 by a spring 26, Fig. 2, but free to be forced into engagement therewith when the stop finger 21 is engaged or struck by the stop arm 19, all substantially as pointed out in said application. Projecting from the sleeve 24 is a finger or arm 27, Figs. 1 and 2, the end of which bears upon the cushioning pin 28, said parts being combined and acting in the manner fully described in the before mentioned application.

Extending from the main frame of the machine is a bracket 29 furnishing a pivotal support for the sleeve actuator, which in the present form of the invention is a bell-crank lever 30, one arm of which, Figs. 1 and 3, is connected to the sleeve 24 by means of a pin 31 engaging between suitable lugs 32 formed on or projecting from the said sleeve. The other arm of the bell-crank 30 is connected by a pin 33 to the rod 34 jointed to the treadle 14, Fig. 2, said connection being preferably made by the pin 33 and slotted upper end 35 of said rod 34, for a purpose which will presently appear. The spring 17, which normally tends to maintain the clutch members 4 and 7 disengaged, is also connected as shown, to the sleeve 24, so that as said spring thus acts upon the clutch members it likewise tends to move the sleeve and stop finger into stopping position with respect to the stop arm and cam 22 on the fast clutch member, and as the treadle 14 is depressed it acts, through the rods 13 and 34, to remove the stop finger 21 from such position and engage the clutch members, as will be clearly apparent to one skilled in the art.

The parts so far described being in the position shown in Fig. 1 with the machine at rest, it is desirable to turn the machine by hand, and as this can be done only when the stop finger 21 is removed from engagement with the stop arm 19 and cam 22, lost motion is provided between the sleeve actuator 30 and treadle operating means, such lost motion being in the form of the pin 33 and slot 35, so that the actuator 30 may be turned on the pin or stud 36 and through the pin 31, and projections 32 slide the sleeve 24 to carry the stop finger 21 out of engagement with the stop arm and cam 22 without at the same time causing the treadle to engage the clutch members. Not only is it desirable to thus enable the machine to be turned by hand but the parts should be locked in position to permit such manipulation and allow the operator to employ both his hands for other work, and, when he is ready to start the machine by power, it is desirable that the single starting movement of the treadle will be sufficient to unlock the parts, maintain the stop finger out of the path of movement of the stop arm 19 and cam 22, and engage the clutch members. Mounted upon the pin or stud 36 is a hand lever 37, the upper or extended portion of which is provided with a segment rack 38, and mounted on a stud 39 projecting from the bracket 29 is a coöperating gear segment 40, the teeth of which engage the teeth of the segment rack 38. The gear segment 40 has a cam portion 41, which, as indicated by dotted lines, Fig. 1, is adapted to engage a lug 42 projecting from the arm of bell-crank 30. At a suitable part in the cam portion 41 of the gear segment 40 is a notch 43 shaped to engage and interlock with the lug 42 on the bell-crank when the parts are moved from the position indicated in Fig. 1 to that indicated in Fig. 3. A spring 44 having one end secured to a pin 45 on the bracket 46 and its other end connected to the gear segment 40 above its supporting pin 39, tends to maintain the parts in the position indicated, Fig. 1, a stop pin 47 serving to limit the effective action of the spring in turning the segments 40 and 38, as will be apparent.

With the parts in the position indicated in Fig. 1, if it is desired to start the machine by power, the treadle 14 is depressed, thereby turning the bell-crank 30 about the pin 36 as a center to slide the sleeve 24 to the right and disengage the stop finger 21 from the stop arm 19 and cam 22, and also engage the clutch members 4 and 7, such movement of the bell-crank 30 being made obviously without disturbing or moving the racks 38 and 40, the latter being on the bracket 29 and the former independently mounted on the stud 36. When the treadle is released, the parts assume the relation as indicated in Fig. 1, by reason of the spring 17. If now it is desired to operate the machine by hand, the parts being as illustrated in Fig. 1, the hand lever 37 is moved to the position indicated in Fig. 3, thereby turning the gear segment 40 and causing its cam portion 41 to move the bell-crank lever 30 as the lug or projection 42 thereon rides up said cam, such movement of the bell-crank lever 30 being permitted by the slot 35. This movement of the bell-crank lever 30 moves the sleeve 24 and stop finger 21 to the right, freeing the fast clutch member 7, and when the lug or projection 42 reaches the notch or recess 43 in the gear segment, it becomes seated therein and locks the segment from movement in either direction, such action being due to the abrupt faces of the notch or recess and the lug or projection, so that when the handle 37 is freed, the parts remain as indicated in Fig. 3, notwithstanding the action of spring 44. If now it be desired to start the machine, the treadle is depressed, whereupon the rod 34 turns the bell-crank lever 30 slightly clockwise to withdraw the lug or projection 42 from the notch or recess 43, this freeing the gear segment 40 to the action of its spring 44, which returns the gear segment 40 and segment rack 38 to their initial position indicated in Fig. 1, the rod 13 also acting to engage the clutch members 4 and 7, all as will be readily understood by those skilled in the art.

Obviously many changes may be suggested as different embodiments of the present invention, the details illustrated and described being intended as a practical exploitation of one form thereof, the essentials of the invention being defined by the claims herewith.

What is claimed is:

1. In a stopping mechanism, a driving shaft, fast and loose clutch members mounted thereon, clutch operating means, a stop-finger or member, means acting normally to maintain said stop-finger or member in engagement with the fast clutch member to prevent movement of the driving shaft, means controlled by the operator and movable independent of the clutch operating means to disengage the stop-finger or member from its holding relation with the fast clutch member while the clutch members remain disengaged, and a lock for holding the finger or member in such disengaged position to permit the driving shaft to be turned.

2. In a stopping mechanism, a driving shaft, fast and loose clutch members mounted in operative relation thereto, treadle actuating means for moving said clutch members into driving engagement, a stop-finger or member, means acting to maintain the clutch members disengaged and the said finger or member in position to prevent rotation of the driving shaft, means under the control of the operator and movable independent of the clutch actuating means to move said finger or member from said position to an inoperative position, and a lock for holding the said stop-finger or member in inoperative position.

3. In a stopping mechanism, a driving shaft, fast and loose clutch members in operative relation thereto, a stop-finger or member, means acting normally to maintain said clutch members disengaged and the stop-finger or member in operative position to prevent rotation of the driving shaft, a treadle to move the stop-finger or member to inoperative position and to engage the clutch members, and means independent of said treadle and under control of the operator to move the stop-finger or member to inoperative position to permit rotation of the driving shaft by hand.

4. In a stopping mechanism, a driving shaft, fast and loose clutch members in operative relation thereto, a stop-finger or member, means acting normally to maintain said clutch members disengaged and the stop-finger or member in operative position to prevent rotation of the driving shaft, a treadle to move the stop-finger or member to inoperative position and to engage the clutch members, means independent of said treadle and under control of the operator to move the stop-finger or member to inoperative position to permit rotation of the driving shaft by hand, and a lock for holding the stop-finger or member in such inoperative position.

5. In a stopping mechanism, a driving shaft, fast and loose clutch members in operative relation thereto, a stop-finger or member, means acting normally to maintain said clutch members disengaged and the stop-finger or member in operative position to prevent rotation of the driving shaft, a treadle to move the stop-finger or member to inoperative position and to engage the clutch members, means under control of the operator to move the stop-finger or member to inoperative position independently of movement of the clutch members to permit rotation of the driving shaft by hand, a lock for holding the stop-finger or member in such inoperative position, and means operated by the starting treadle to trip the lock.

6. In a stopping mechanism, the combination of a driving shaft, fast and loose clutch members in operative relation thereto, a stop on the fast clutch member, a stop-finger, means to move the stop-finger into engagement with said stop and to disengage the clutch members, means to move the stop-finger out of engagement with the said stop and separate means to engage the clutch members, and devices controlled by the operator to move the stop-finger out of engagement with said stop independently of movement of the clutch operating means.

7. In a stopping mechanism, the combination of a driving shaft, fast and loose clutch members associated therewith, a stop-finger, a treadle, connections between the stop-finger and treadle for withdrawing the stop finger from operative position, separate connections between the loose clutch member and treadle for starting and stopping the driving shaft, a hand operated lever for moving the stop-finger independently of the treadle, and provisions in the connection between the treadle and stop-finger to permit such independent movement.

8. In a stopping mechanism, the combination of a driving shaft, fast and loose clutch members associated therewith, a stop-finger to normally prevent rotation of the main shaft when the clutch members are disengaged, means controlled by the operator for moving the stop-finger from its position preventing rotation of the main shaft, a lock for holding the stop-finger in the position to which it has been thus moved, and means operated upon starting the machine to unlock the stop-finger.

9. In a stopping mechanism, the combination of a driving shaft, fast and loose clutch members associated therewith, a stop-finger to normally prevent rotation of the main shaft when the clutch members are disengaged, a hand operated rack for moving the stop-finger independent of relative movement of the clutch members, a lock for holding the stop-finger in the position to which it is moved by the hand operated rack, and treadle operated means for relatively moving the clutch members and resuming control of the stop-finger.

10. In a stopping mechanism, the combination of a driving shaft, fast and loose clutch members associated therewith, a stop-finger for preventing rotation of the main shaft when the clutch members are disengaged, a gear segment having a cam for moving the stop-finger from its stopping relation with the main shaft when the clutch members are disengaged, and means operated by the attendant for moving said gear segment and cam.

11. In a stopping mechanism, the combination, with driving and driven members and a clutch connection between said members, actuating devices for moving the clutch connection, of means operatively connected with said clutch connection for holding said driven member against movement when said clutch connection is disengaged, and means whereby said holding means may be released independently of movement of the clutch actuating devices to permit manual operation of said driven member.

12. In a stopping mechanism, the combination with driving and driven members and a clutch connection between said members, of means for controlling said clutch connection, means operatively connected with said controlling means for holding said driven member against movement when said clutch connection is disengaged, and means whereby said holding means may be released independently of movement of said controlling means to permit manual operation of said driven member.

13. In a stopping mechanism, the combination of a shaft, fast and loose clutch members associated therewith, a stop on the fast clutch member, a stop finger to engage said stop, a lever for moving the clutch members into engagement, a separate lever for moving the stop finger into and out of operative position with relation to the stop, means for moving both of said levers, and separate means for moving the finger actuating lever into inoperative position independently of the clutch actuating lever.

14. In a stopping mechanism, the combination of a shaft, fast and loose clutch members associated therewith, a stop on the fast clutch member, a stop finger to engage said stop, a lever for moving the clutch members into engagement, a separate lever for moving the stop finger into and out of operative position with relation to the stop, means for moving both of said levers, separate means for moving the finger actuating lever into inoperative position independently of the clutch actuating lever, and a lock to hold the finger actuating lever when moved into inoperative position by said separate means.

15. In a stopping mechanism, the combination of driving and driven members, a clutch connection between said members, clutch actuating devices, means for holding the driven member from movement when the clutch connection is disengaged, means for releasing said holding means, a lock for holding it in releasing position, and means for automatically tripping the lock as the clutch actuating means is operated.

In testimony whereof, I have signed my name to this specification, in the presence of two subscribing witnesses.

THOMAS G. PLANT.

Witnesses:
AMELIA M. ROSS,
MARION F. KIMBALL.